Dec. 16, 1924.  
G. J. BURNS  
1,519,483  
FUEL SYSTEM FOR INTERNAL COMBUSTION ENGINES  
Filed Dec. 9, 1921  2 Sheets-Sheet 1
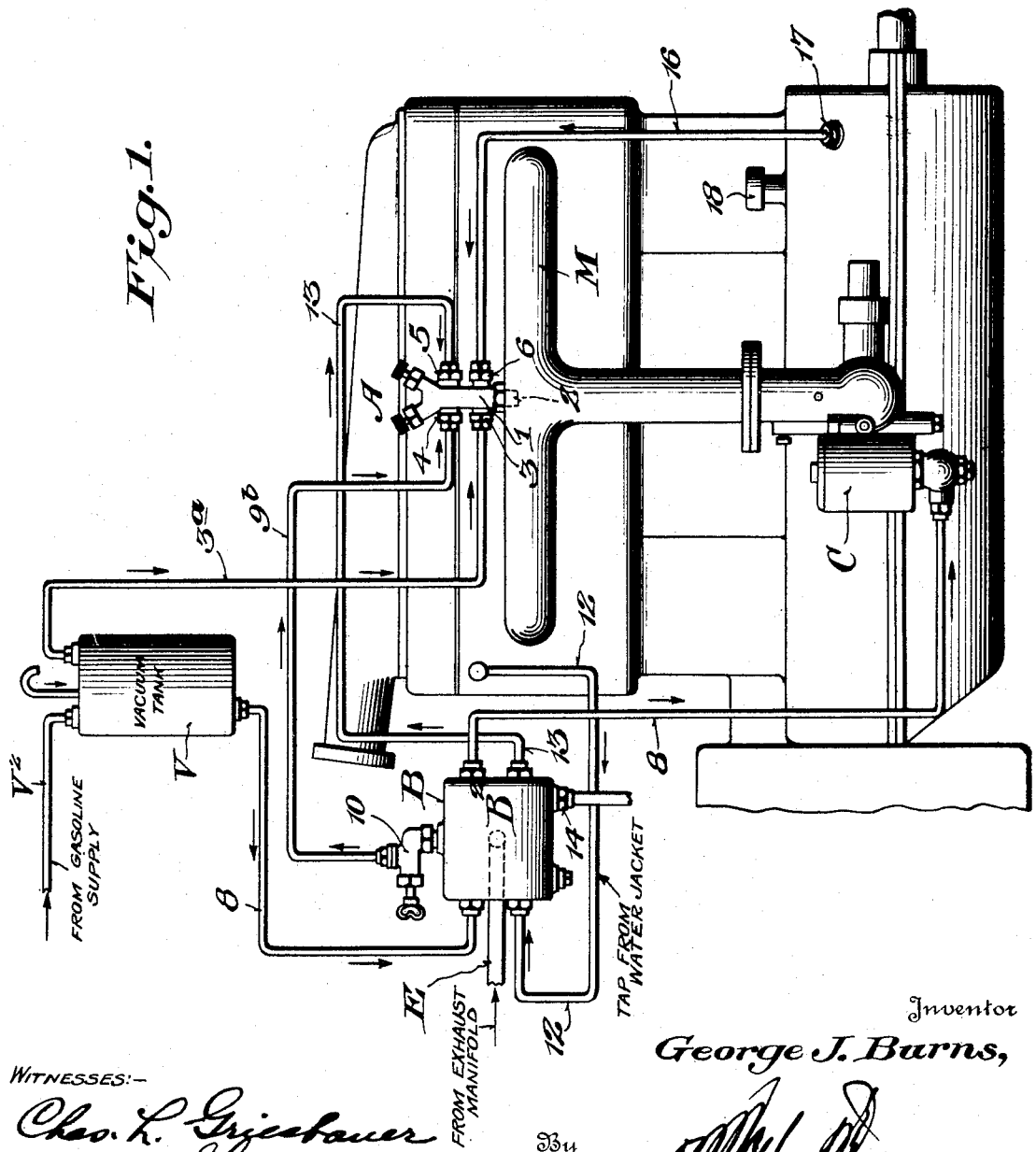

Dec. 16, 1924. 1,519,483
G. J. BURNS
FUEL SYSTEM FOR INTERNAL COMBUSTION ENGINES
Filed Dec. 9, 1921 2 Sheets-Sheet 2
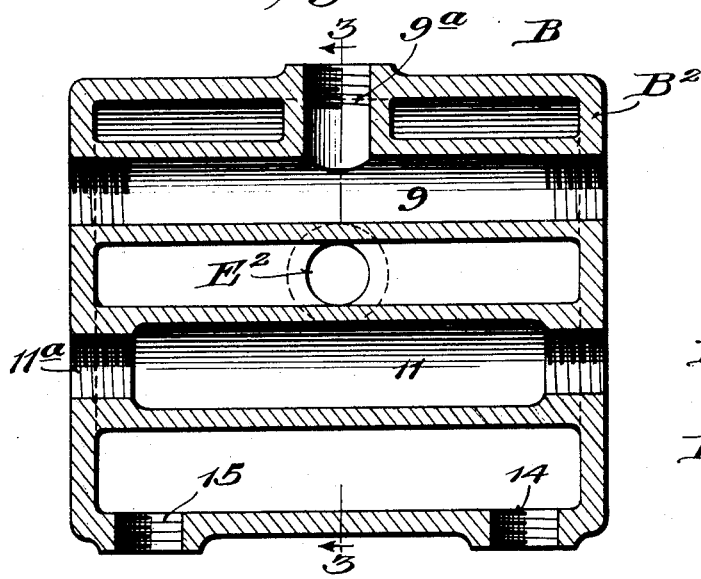
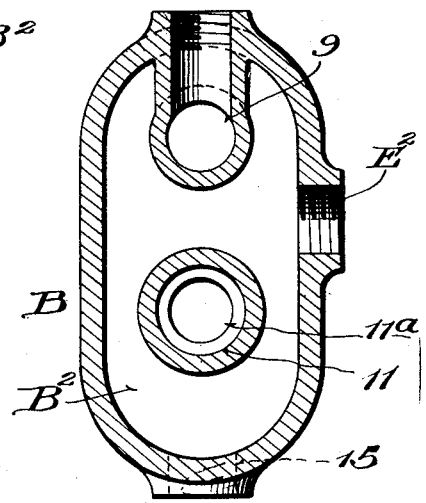
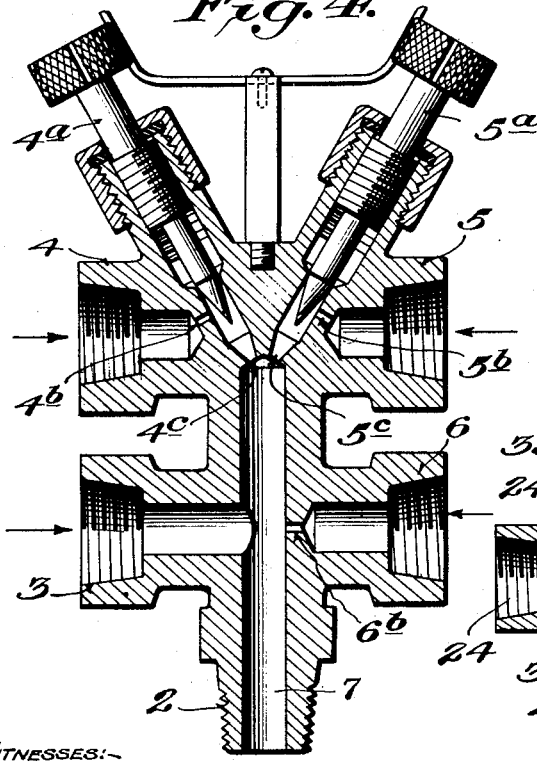
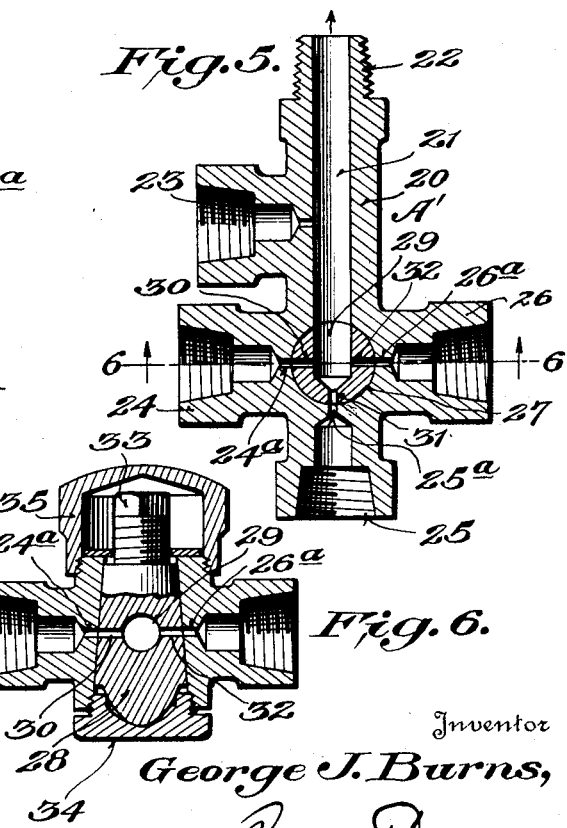
Inventor
George J. Burns, Patented Dec. 16, 1924.

1,519,483

UNITED STATES PATENT OFFICE.

GEORGE J. BURNS, OF YOUNGSTOWN, OHIO.

FUEL SYSTEM FOR INTERNAL-COMBUSTION ENGINES.

Application filed December 9, 1921. Serial No. 521,192.

*To all whom it may concern:*

Be it known that I, GEORGE J. BURNS, a citizen of the United States, residing at Youngstown, in the county of Mahoning and State of Ohio, have invented certain new and useful Improvements in Fuel Systems for Internal-Combustion Engines, of which the following is a specification.

This invention relates to an improved fuel supplying system for internal combustion engines.

To that end the invention contemplates a system involving novel devices for utilizing all of the available fuel vapors formed incident to the operation of an internal combustion engine, thereby utilizing such vapors as the constituents of a combustible fuel gas having a maximum efficiency as a fuel charge. That is to say, the present invention has in view novel means for heating the usual liquid fuel supplied to the carburetor of the motor, and utilizing the vapor given off by the fuel due to such heating, in combination with steam generated from water supplied from a suitable source, together with the vapors ordinarily collecting in the crank case of the motor due to the mixing of the gases, which escape past the piston rings on the compression stroke, coming in contact with the lubricant in the crank case.

In its general aspect, therefore, the present invention proposes a system involving suitable devices for utilizing fuel vapor, steam, and otherwise wasted fuel and oil vapors by collecting the same and mixing them into an efficient combustible combination which may be fed into the manifold of the motor to become a part of the regular fuel charge supplied by the carburetor.

A further and more specific object of the invention is to provide a novel mixing device for the various fuel-forming vapors which automatically functions during the operation of the motor to collect such vapors and feed them to the fuel line so that they can be properly assimilated in the fuel charge which is supplied to the engine.

With the above and other objects in view which will more readily appear as the nature of the invention is better understood, the same consists in the novel construction, combination, and arrangement of parts hereinafter more fully described, illustrated and claimed.

A preferred and practical embodiment of the invention is shown in the drawings, in which:

Figure 1 is a diagrammatic view showing the improved fuel system in connection with a motor.

Figure 2 is a vertical longitudinal view of the heater unit.

Figure 3 is a vertical cross sectional view of the heater construction shown in Figure 2.

Figure 4 is an enlarged vertical sectional view of the mixing unit.

Figure 5 is a vertical sectional view of a modified type of mixing unit.

Figure 6 is a cross sectional view taken on the line 6—6 of Figure 5.

Similar reference numerals designate corresponding parts throughout the several figures of the drawings.

In carrying the present invention into effect it is proposed to utilize all of the available fuel vapors generated by the operation of an internal combustion engine, not only for the purpose of effecting a maximum economy in fuel consumption, but also increase the life of the motor and the lubricating oil contained within the crank case.

It is a well known effect that steam when used as a part of the combustion charge produces an efficient combustible mixture not only because its addition to the mixture assists the process of combustion, but also because the oxygen supplied by the steam consumes the carbon element resulting from the explosion, thereby preventing deposits of soot or carbon on the cylinder walls of the engine.

Also, due to leaky piston rings and similar causes, it is known that a certain proportion of the vaporized fuel constituting the usual combustion charge collects in the crank case of the motor and has the effect of thinning or deteriorating the lubricating oil, which when heated to a high degree, is susceptible of being easily broken up by the fuel vapor thereby destroying its value as a lubricant.

Accordingly, the present invention involves the use of a novel arrangement of instrumentalities for efficiently collecting and mixing the various fuel vapors, and supplying the same to the intake line of the motor at any suitable and convenient point. Primarily, the invention comprises two coordinated units, namely, a mixing unit A and a heating unit B. The mixing unit A has piped communication with the sources of vapor supply, namely, with that part of the heating unit which vaporizes fresh fuel, with that part of the heating unit which vaporizes water, making steam, and also with the waste gases which accumulate in the crank case of the motor. And, as indicated the heating unit embodies means for vaporizing at least a part of the fresh fuel such as gasoline, and also for vaporizing water to make the steam, the said heating unit preferably, though not necessarily being of the type which utilizes the hot exhaust gases from the motor as the heating medium.

Referring first to the mixing unit A it will be observed that the same is fitted to the intake manifold M of the engine at any suitable and convenient point. In the example chosen for illustrative purposes, in the present case, a type of motor utilizing a vacuum fuel supply system is shown, and in such a construction the mixing unit A may be inserted in the opening in the manifold where the vacuum pipe line leading to the auxiliary vacuum tank of the vacuum system usually connects. However, it will of course be understood that the invention is in no way limited in its application to motors having a vacuum type of fuel supply, but may be used with equal facility with motors having a gravity feed system, the only difference being a matter of plugging or otherwise closing the usual pipe connection leading to the auxiliary vacuum tank designated as V in Figure 1.

The mixing unit A primarily includes a casing 1 having a threaded nipple portion 2 to facilitate its application to the intake manifold of the motor, and formed on opposite sides thereof with suitable inlet connections 3, 4, 5 and 6 all of which communicate with a main mixing chamber 7 which may be of the form shown in Figure 4. Connection 3 is for the vacuum line leading to the vacuum tank V; connection 4 is for the fuel vapor line; connection 5 is for the steam supply, while connection 6 is for the line which extracts vapors from the crank case. As may also be observed from this latter figure the connections 4 and 5 are provided with needle valve or equivalent devices $4^a$ and $5^a$, respectively for controlling the relatively restricted outlet passages $4^b$ and $5^b$ which establish communication between the connections 4 and 5 and the mixing chamber 7 through the openings $4^c$ and $5^c$ respectively.

Referring first to the means for utilizing the vapor given off by the heated fuel which is supplied to the usual carburetor C it will be observed that it is proposed to extract the vapor incident to the heating of the fuel in the unit B and carry it direct to the manifold while the unvaporized liquid portion of the fuel passes on to the carburetor for use in the usual manner, except however for the fact that its efficiency is increased due to the preheating obtained in the unit B. In employing the invention in connection with a standard type of vacuum system which includes the vacuum gasoline tank V usually positioned under the hood of the vehicle above the motor, it is proposed to connect said tank with the intake manifold M through the mixing unit A by means of the pipe line $3^a$ between the connection 3 and the vacuum tank. The measured quantities of fuel sucked into the vacuum tank V from the source of gasoline supply through the line $V^2$ pass from the tank to the carburetor C by way of the pipe line 8, but in the course of such passage the fuel is conducted through the heating chamber 9 of the unit B which is heated by any suitable means such as the exhaust gases from the motor, whereupon a portion of the fuel is vaporized and conducted directly to the mixing unit A by means of the pipe line $9^b$ leading to the connection 4. So much of the liquid fuel as is not vaporized in the unit B therefore passes on to the carburetor C through the portion of the pipe line 8 between the heating unit B and the carburetor C. As shown in Figure 1 the fuel vapor line 9 may be provided with a valve 10 for controlling the passage of vapor in said line, and although this valve may be located at any suitable point in the line may be conveniently mounted on the casing of the heating unit B.

The heating unit B may be of any suitable construction for pre-heating the liquid fuel supplied to the carburetor C and for also converting water into steam to be supplied to the mixing unit A at the connection 5. However, a simple and practical type of heater is shown in Figures 2 and 3 of the drawings wherein it will be observed that the same includes a suitable casing or jacket $B^2$ having the fuel heating chamber 9 therein and the fuel vapor outlet connection $9^a$ while the opposite ends thereof are threaded or otherwise suitably formed to receive couplings for connecting the ends of the pipe 8 thereto. In addition to the liquid fuel heating chamber 9 the heating unit B includes a water vaporizer chamber 11 which may communicate at the end $11^a$ thereof with a water supply line 12 tapped into the water jacket of the motor, while the opposite end thereof may be connected by means of the pipe 13 with the steam connection 5 of the mixing device A.

As the heating unit B is preferably for the sake of convenience and economy of the exhaust heater type it may be connected with the exhaust pipe from the engine by means of the line E which communicates with the casing $B^2$ at a point between the chambers 9 and 11 as indicated at $E^2$ in Figure 2. Thus the full benefit of the hot gases from the exhaust manifold is distributed within the casing around and about the chambers 9 and 11 and after imparting their heating effect thereto may escape through the outlet opening 14. As shown in Figure 2 the heater casing B² may be also provided with a clean out opening 15 which may be provided with a plug in the ordinary use of the device as indicated in Figure 1.

Thus, the mixing device A may be supplied with water vapor or steam through the connection 5 in proper quantities to give the desired results. In other words the vacuum existing in the intake manifold of the engine will exert its influence through the mixing chamber 7 of the mixing unit to draw the steam from the unit B and also draw the fuel vapor from the fuel heating chamber 9, and simultaneously with the functioning of the fuel vapor and steam supplying portions of the unit, the said device will also draw the usable fuel vapors from the crank case of the engine through the line 16. This pipe line may be tapped into the crank case at any suitable and convenient point above the oil level as indicated at 17 and may be coupled with the connection 6 of the mixing unit. The pull of the vacuum in the mixing chamber 7 will draw the gases in the crank case into the mixing device through the pipe 16, and not only use the otherwise wasted vapors in the crank case but also have the effect of keeping the lubricating oil at a sufficiently lower temperature to maintain its viscosity and insure its maximum efficiency at all times as a lubricating agent.

In connection with the functioning of the mixing device it will of course be understood that the cooling effect on the oil in the crank case is due to the intake of relatively cool outside air into the crank case through the usual breather or filler pipe 18 on the crank case of the motor. This air in addition to keeping the oil in the crank case at the proper temperature mixes with the gases or vapors collecting in the crank case and is drawn into the mixing device A along with the other constituents which are brought together and thoroughly mingled and mixed in the chamber 7 of the mixing device.

It will be observed in the mixing unit A, that the passages establishing communication between the mixing chamber 7 and the gas, steam and vapor pipe lines are relatively small as compared with the passage establishing communication with the pipe line leading to the vacuum tank. This construction provides for the proper functioning of the usual vacuum system on motors which utilize the same, and also has the advantage of making the orifices 4ᵇ, 5ᵇ and 6ᵇ in the nature of jet orifices which insure a better mixing of the several vapors with the air supplied to the mixing chamber through the usual auxiliary vacuum tank.

A modified type of mixing unit is shown in Figures 5 and 6 of the drawings, the same having primarily in view a novel mixing chamber and valve arrangement which is capable of being set and locked to prevent unauthorized tampering or undue shifting under the jar or vibration of heavy vehicles such as tractors and the like.

This modified mixing unit A¹ includes a casing 20 having a passage 21 and an attaching nipple portion 22. Also, as shown in Figure 5 the casing is formed with a vacuum intake connection 23, steam connection 24, fuel vapor connection 25 and oil vapor connection 26. The connections 24, 25 and 26 communicate through restricted passages 24ª, 25ª and 26ª with the enlarged circular bore 27 formed at one end of the passage-way 21 and adapted to receive a four-way valve 28 having a relatively large outlet 29 for registering with the passage-way 21 and smaller communicating passages 30, 31, and 32 for registering with the passages 24ª, 25ª and 26ª of the connections referred to. As will be observed from the drawings the body of the valve 28 is of substantially conical formation, and is provided with a suitable tool engaging head 33 whereby it may be rotated on its axis so as to throw the portion 30, 31 and 32 out of registry with the corresponding passages in the casing to uniformly regulate or throttle all of such passages as desired.

For the purpose of holding the valve 28 in its said position a screw binding cap 34 may be utilized while the tool engaging end 33 thereof may be protected by a similar cap 35, thus safely guarding the valve from accidental displacement when in use.

This modified type of valve has the advantage of consolidating the valve adjustments in one convenient type of valve and also arranges the vapor ports in closer proximity to thereby insure a positive and effective mixing of the vapors before they are drawn into the manifold of the engine.

From the foregoing it is thought that it will be apparent that the present improvement contemplates the coordination of all of the various fuel vapors necessary to produce a combustible mixture of maximum efficiency and at the same time provides for the distinctive advantage of keeping the oil in the crank case at a proper temperature for insuring safe vaporization and also preventing its deterioration by the volatile fuel vapors passing the piston rings and collecting in the crank case. Another distinctive feature of the invention is the arrangement which permits of the thorough mixing of these vapors prior to their entry into the manifold of the engine thus insuring their proper assimilation with the usual fuel charge for the cylinders.

I claim:—

1. A fuel preparing and feeding apparatus for internal combustion engines including the combination with the intake manifold and the carbureter connected therewith, of a mixing device communicating with the manifold, a heating unit having separate chambers respectively for pre-heating fuel supplied to the carbureter and also for heating water to produce steam, separate pipe connections between the mixing device and heating unit respectively for fuel vapor and steam, and a pipe connection also between the mixing device and the crank case of the motor.

2. A fuel preparing and feeding apparatus for internal combustion engines including the combination with the intake manifold and carbureter and the liquid fuel line from the vacuum tank to the carbureter, of a mixing device communicating with the intake manifold, a separate heating unit having a water vaporizing chamber, a pipe-connection between said vaporizing chamber and the mixing device, said separate heating unit having a liquid fuel chamber forming a part of the liquid fuel supply line from the vacuum tank to the carbureter, a fuel-vapor pipe-connection from said last named chamber to the mixing device, and a pipe-connection also between said mixing device and the crank case of the motor.

3. A mixing device for fuel preparing and feeding apparatus for internal combustion engines, including a body having a central bore, a normally open passageway communicating with said bore and adapted to connect with the vacuum tank of the fuel supply system of the motor, live gas-vapor and steam inlet connections also communicating with said bore, and valves for controlling the communication between said live gas vapor and steam inlet connections with said bore.

4. A mixing device for fuel preparing and feeding apparatus for internal combustion engines including a body having a central bore and adapted to fit into the intake manifold of the engine, a vacuum pipe connection communicating with said bore of the body, and valved connections also communicating with said bore and adapted to respectively supply live gas-vapor, steam, and crank case vapors thereto.

In testimony whereof I hereunto affix my signature in the presence of two witnesses.

GEORGE J. BURNS.

Witnesses:
 EMORY L. GROFF,
 VIRGINIA L. WATSON.